Nov. 10, 1925.
J. M. EATON
ELEVATING TRUCK
Filed Aug. 10, 1922
1,560,675
2 Sheets-Sheet 1
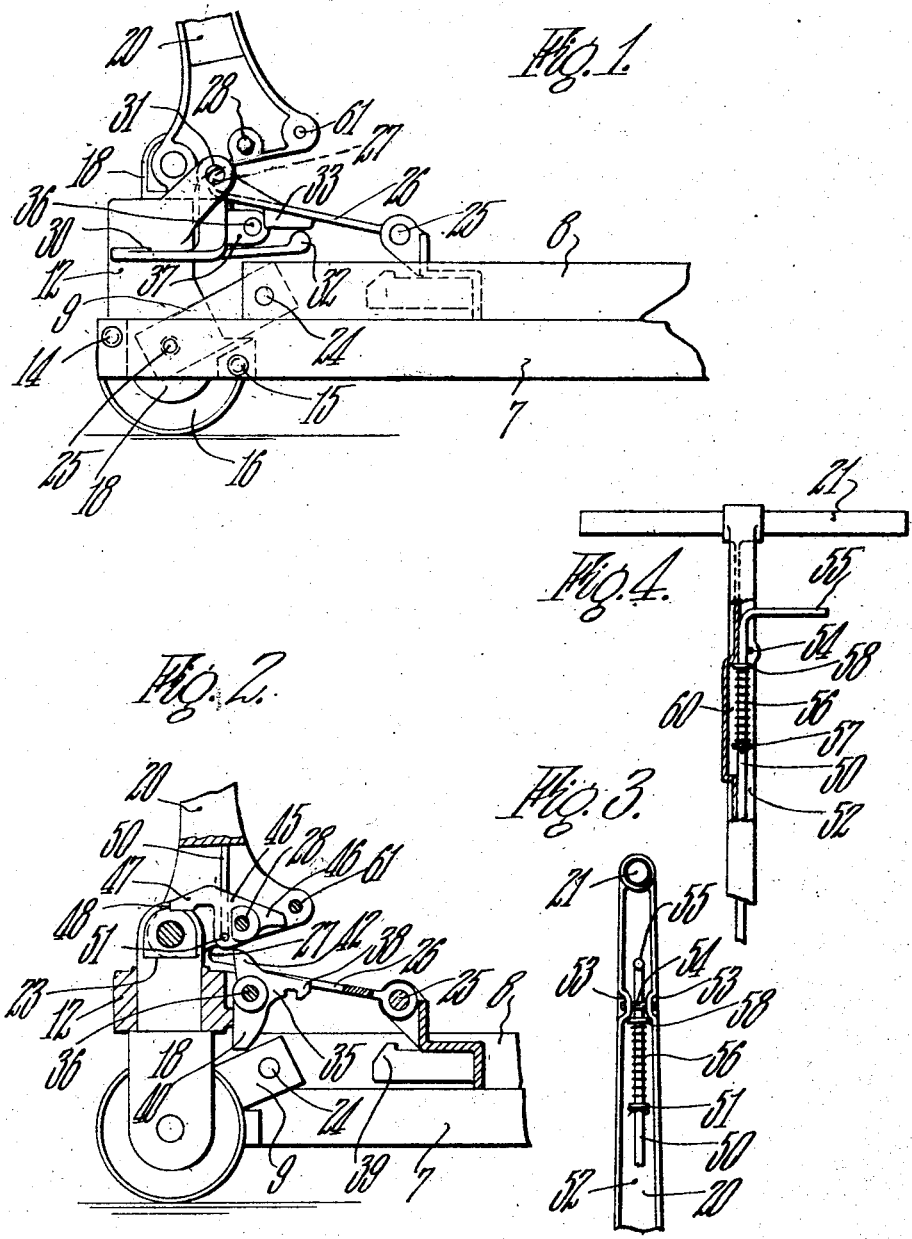
INVENTOR
James M Eaton
BY Chapin & Neal
ATTORNEYS Nov. 10, 1925.                J. M. EATON                1,560,675
                           ELEVATING TRUCK
                        Filed Aug. 10, 1922      2 Sheets-Sheet 2
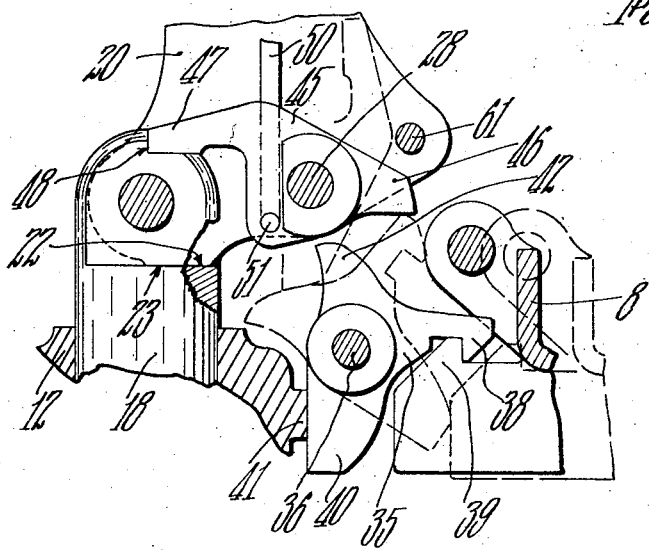
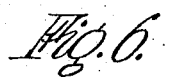
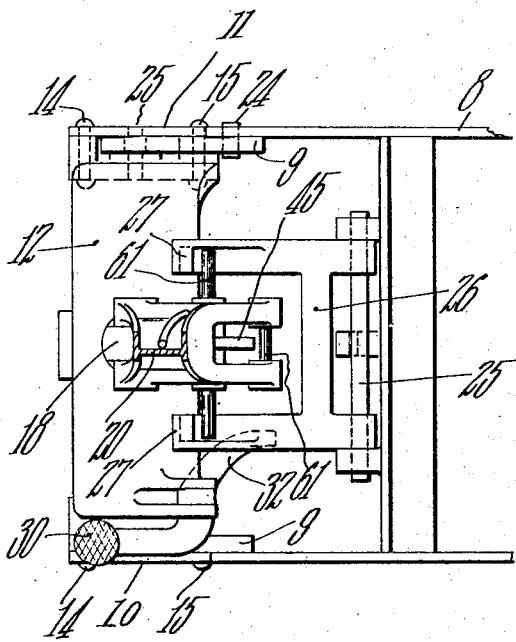
INVENTOR
James M. Eaton
BY Chapin Neal
ATTORNEYS Patented Nov. 10, 1925.

1,560,675

UNITED STATES PATENT OFFICE.

JAMES M. EATON, OF HOLYOKE, MASSACHUSETTS, ASSIGNOR TO EDWARD N. WHITE, J. LEWIS WYCKOFF, AND JAMES M. EATON, ALL OF HOLYOKE, MASSACHUSETTS, TRUSTEES, DOING BUSINESS AS COWAN TRUCK COMPANY.

ELEVATING TRUCK.

Application filed August 10, 1922. Serial No. 580,909.

*To all whom it may concern:*

Be it known that I, JAMES M. EATON, citizen of the United States, residing at Holyoke, in the county of Hampden, and State of Massachusetts, have invented new and useful Improvements in Elevating Trucks, of which the following is a specification.

This invention has reference to improvements in elevating trucks and is particularly concerned with locking means for holding the platforms of elevating trucks in raised position.

The general object of the invention is to provide in connection with means for automatically locking the platform of an elevating truck in raised position, improved and simplified means operable at will for releasing said locking means.

The invention consists in the features of construction and the arrangements and combinations of parts hereinafter described and claimed, the advantages of which will be apparent to those skilled in the art.

The invention will be best understood from a description of the preferred embodiment thereof illustrated in the accompanying drawings, in which:—

Fig. 1 is a side elevational view of the front end portion of an elevating truck showing the present invention embodied therein;

Fig. 2 is a view, in vertical longitudinal section, of the portion of the truck shown in Fig. 1;

Fig. 3 is a detail view, in side elevation of the steering handle showing part of the mechanism which functions in the releasing of the platform locking means;

Fig. 4 is a view, partially in front elevation and partially in section of the parts shown in Fig. 3;

Fig. 5 is a view similar to a portion of Fig 2 but on an enlarged scale and showing the truck platform in raised position; and Fig. 6 is a top plan view of the mechanism shown in Figs. 1 and 2.

Referring to the drawings, the features of the present invention have been therein illustrated as embodied in an elevating truck of the same general character as the truck disclosed in United States Letters Patent No. 1,373,069 to D. E. Hennessy, dated March 29, 1921. Consequently only a brief and general description will be given herein of those parts of the illustrated truck which correspond to similar parts in the truck described in the aforesaid patent, reference being had to said patent for a more detailed description if desired. The truck shown in the drawings comprises a base frame 7 and an elevating platform 8 which is connected with the base frame by means of swinging links 9 which enables the platform to be raised and lowered. The frame 7 consists of two side beams 10 and 11 (Fig. 6) which are connected at their front ends by means of a head 12 and at their rear extremities by means of a suitable cross bar (not shown). The construction of the base frame of the present truck differs somewhat from that shown in the patent referred to in that the side beams 10 and 11 are severally riveted or otherwise rigidly secured to the head 12 at two longitudinally spaced points as indicated at 14 and 15, to reinforce said beams against side strain. The side beams 10 and 11 are also spaced from the adjacent ends of the head 12 to permit the swinging links 9 to be interposed between the head and the respective side beams.

The base frame is provided with the usual supporting wheels (not shown) at the rear and with a steering wheel at the forward end thereof. The steering wheel 16 is carried by a vertical wheel fork 18 which is swivelled in the head 12 and a steering handle 20 is forked at one end to straddle the projecting upper end of the wheel fork, the fork of the handle being pivotally connected to the wheel fork by a horizontal stud 19. This construction adapts the handle for vertical and horizonal swinging movements in hauling and guiding the truck. The handle 20 is provided, at its free extremity, with a cross bar 21 which affords a convenient hand hold for the operator. The handle 20 is also provided, at its pivoted end, with flat stop faces 22 adapted to engage shoulders 23 on the wheel fork to determine the vertical position of the handle 20.

The platform 8, which is of the usual rectangular construction, rests upon the base frame when in lowered position and is supported by the swinging links 9 when in raised position. There are a pair of links 9 at each end of the platform 8, only the forward pair of links being shown in the drawings. Each link 9 is pivoted at 24 to the platform and at 25 to the base frame.

The steering handle 20 is also utilized as the operating lever for lifting the platform 8. To this end the handle 20 is adapted to be detachably connected with the platform by means of a vertically swinging hook link 26 that is pivoted at its rear extremity upon the platform. The hook link 26 is formed with two parallel arms the free forward ends of which are provided with hooks 27 for engagement with a cross-pin 28 carried by the handle 20 the opposite ends of the cross-pin projecting upon opposite sides of the handle into the vertical planes of the hooks 27.

Normally the hook link 26 is disengaged from the cross-pin 28 and rests idly upon the upper surface of the head 12. The idle position which hook link 26 assumes when the truck platform is in its lowered position is shown in Figs. 1 and 2.

To enable the platform to be elevated the hook link 26 is raised from the idle position shown in Figs. 1 and 2 into position to be engaged by the cross-pin 28 by the action of a foot treadle 30. The foot treadle 30 is pivotally mounted upon a horizontal stud 31 and is provided with a rearward extension 32 which underlies one of the side arms of the hook link and is adapted to abut against a boss 33 formed on the hook link for lifting the latter to place it in engaging position with respect to the handle. The handle is then manipulated to engage the cross-pin 28 with the hooked ends of the hook link and the treadle is released. The handle may then be swung forwardly and downwardly to elevate the platform.

With the exception of the provision hereinbefore referred to for reinforcing the side beams of the base frame against side strain, all parts thus far described are or may be substantially the same in construction and they may operate in substantially the same manner to perform the functions stated as corresponding parts disclosed in above named Patent No. 1,373,069.

The present invention however, is concerned with the provision of novel and improved means for holding the platform with its load in raised position and for releasing said holding means to permit the descent of the platform when desired.

The improved holding means consists of a latch 35 which is pivotally mounted upon a stud 36 carried by ears 37 projecting rearwardly from the head 12. The latch 35 is formed with a rearwardly extending hook 38 for cooperatively engaging a forwardly projecting hook 39 on the platform 8; a depending stop arm 40 which coacts with a boss 41 on the head 12 to limit the swinging of the latch under the influence of gravity so as to locate the hook 38 in position to engage the hook 39 when the platform is elevated; and an upstanding lug 42 adapted to be engaged by latch operating means which will shortly be described. The center of gravity of the latch 35 is so disposed with respect to the pivot stud 36 that the latch is normally maintained by gravity in position to engage the hook 39 when the platform is raised or to maintain holding engagement between said latch and the hook 29 when the platform is in raised position. A suitable spring (not shown) may be used if desired to reinforce this gravity return action of hook 38 which spring would be connected so as to normally hold the hook in position shown in Fig. 2.

The means for operating the platform holding latch 35 comprises a dog 45 which also functions as a latch for releasably holding the steering handle 20 in upright position. The dog 45 is pivotally mounted upon the central portion of the cross pin 28 and is located between the forked lower extremities of the handle 20. The dog 45 has a rearwardly projecting nose 46 for cooperatively engaging the cam lug 42 to lift the latch 35 out of platform holding position. The dog 45 is also provided with a forwardly extending latch finger 47 that is adapted to enter a notch 48 in the upper end of the wheel fork 18 when the handle 20 is elevated to a vertical position as shown in Figs. 2 and 5.

The dog 45 is adapted to be rocked in a clockwise direction from the position in which it appears in Fig. 2 to withdraw the latch finger 47 from the notch 48 and thus to release the handle 20 so that it may be swung downward for the purpose of lifting the platform or to enable the handle to be used in hauling the truck. When the handle 20 is upright and the platform 8 is raised, a rocking movement of the dog 45 of somewhat greater amplitude than above described, but in the same direction, will operate as hereinafter described to lift the latch hook 38 and release the platform 8 to permit its descent. A similar rocking movement of the dog 45, when the steering handle is held in any angular position by the operator, will operatively position the dog 45 so that it will function as the handle is subsequently raised into upright position to actuate the latch 35 so as to release the platform.

In order that the dog 45 may be conveniently actuated for the purposes set forth, an actuating rod 50 is mounted for vertical sliding movement in the handle 20 and the lower end of the rod 50 is pivotally connected at 51 to the dog 45. The actuating rod 50 is located in a longitudinal channel 52 in one side of the handle 20. Indented portions 53 in the opposite side walls of the channel 52 in the handle restrict the width of said channel at a point near the free extremity of the handle and prevent lateral displacement of the actuating rod toward the sides of the channel. A pin 54, extending transversely across the channel 52 and through the indented side wall portions 53, maintains the actuating rod in sliding engagement with the base of the channel. At a point above the cross pin 54 the upper end of the actuating rod 50 is bent at right angles to its length to provide a handle 55 so located that it may be grasped conveniently by the fingers of the operator while grasping the cross bar 21 of the steering handle. A spring 56 is coiled around the actuating rod 50 and bears, at its lower end against a collar 57 that is held against downward movement on the rod, and at its upper end against a collar 58 that is held against upward movement relatively to the handle by the indented handle portions 53. The force of the spring 56 urges the actuating rod downwardly and tends to maintain the dog 45 at all times in such a position that it will be inoperative upon swinging movement of the handle to actuate the latch 35. When the handle 20 is upright, as shown in Fig. 5, the force of the spring 56 tends to hold the latch finger 47 of the dog 45 in the notch 48 so as to latch the handle in its vertical position. The base of the channel 52 is enlarged at 60 to accommodate the spring 56. A stop pin 61, extending transversely across the forked end of the handle 20, is adapted to engage the upper edge portion of the dog 45 to limit its movement when rocked by the actuating rod 50.

After the platform has been raised and the truck has been transported to its destination, the platform may be released by upward swinging movement of the handle 20. In order that the upward movement of the handle 20 may be effective to release the platform it is only necessary to operatively position the dog 45 by grasping the bent or handle portion 55 of the actuating rod 50 and drawing it toward the cross bar 21, thus sliding the actuating rod upward relatively to the handle 20. This upward movement of the actuating rod 50 will rock the dog 45 into the position shown by dotted lines in Fig. 5. With the dog 45 held in this angular position relatively to the handle 20, the nose 46 of the dog will engage the curved cam face at the upper side of the lug 42 as the handle 20 approaches upright position and before the stop face 22 on the handle engages the limiting shoulder 23, the dog will have rocked the latch 35 from the full line position in Fig. 5 to the dotted line position in said figure, thus lifting the hook 38 away from the hook 39 and unlocking the platform. The operator may easily hold the dog 45 in position to actuate the latch 35 during the upward swing of the steering handle, by simply maintaining his grasp upon the cross-bar 21 and upon the bent upper end of the actuating rod 50 as the steering handle is operated.

If it is desired to latch the steering handle in upright position without releasing the platform 8, this may be readily accomplished by merely raising the handle without lifting the actuating rod 50, and when the handle reaches vertical position the dog will operate, under the influence of the spring 56 to project the latch finger 47 into the notch 48. It will be understood that the latch finger 47 may be withdrawn from the notch 48 to release the handle for downward swinging movement by a slight upward pull on the bent upper end of the actuating rod 50, the resulting upward movement of the actuating rod being insufficient to rock the dog 45 so as to release the platform. If, however it is desired to release the platform when the steering handle is latched in vertical position this may also be readily accomplished by merely grasping the bent handle portion 55 of the actuating rod and lifting said rod to the full extent of its upward movement, thereby rocking the nose 46 of the dog 45 against the lug 42 on the latch 35 and rocking said latch to disengage the hooks 38 and 39.

It will be noticed that in the above described construction, a single movable member, namely the pivoted dog 45, is employed to perform the combined functions of latching the steering handle in its upright position, unlatching said handle, and releasing the locking means which holds the platform in elevated position. In this way multiplicity of operating parts is avoided and a very simple and effective mechanism is provided for accomplishing the results above set forth.

The invention has been disclosed herein for illustrative purposes in an embodiment at present preferred but the scope of the invention is to be determined from the appended claims rather than from the foregoing description.

What is claimed is:—

1. In an elevating truck, in combination, an elevating platform, steering and supporting wheels therefor, carrying portions for said wheels, a steering handle pivoted for vertical swinging movement, means for elevating said platform by vertical swinging movement of said handle comprising a detachable connection between the handle and the platform, separate means unconnected with the handle for locking the platform in raised position, and a dog pivoted to said handle and adapted to be rocked relatively to said handle to engage and release said locking means when said handle is swung into or is in upright position.

2. In an elevating truck, in combination, an elevating platform, steering and supporting wheels therefor, carrying portions for said wheels, a steering handle pivoted for vertical swinging movement, means for elevating said platform by vertical swinging movement of said handle comprising a detachable connection between the handle and the platform, separate means for locking the platform in raised position, means for latching the handle in upright position comprising a dog carried by the handle, said dog being operable when the handle is upright to release said locking means.

3. In an elevating truck, in combination, an elevating platform, steering and supporting wheels therefor, carrying portions for said wheels, a steering handle pivoted for vertical swinging movement, means for elevating said platform by vertical swinging movement of said handle comprising a detachable connection between the handle and the platform, separate means for locking the platform in raised position, means for latching the handle in upright position comprising a dog carried by the handle and adapted to be set relatively to the handle to engage and release said locking means as said handle is swung into upright position.

4. In an elevating truck, in combination, an elevating platform, steering and supporting wheels therefor, carrying portions for said wheels, a steering handle pivoted for vertical swinging movement, means for elevating said platform by vertical swinging movement of said handle comprising a detachable connection between the handle and the platform, separate means for locking the platform in raised position, a dog pivoted on the handle and adapted to be set relatively to the handle to engage and release said locking means as said handle is swung into upright position, means normally operative to hold said dog out of lock-releasing position, and means carried by said handle and manually operable to set said dog in lock-releasing position when the handle is inclined or to actuate said dog to release said locking means when the handle is upright.

5. In an elevating truck, in combination, a base frame, steering and supporting wheels therefor, an elevating platform carried by said base frame, a steering handle pivoted for vertical swinging movement, means for elevating said platform by vertical swinging movement of said handle comprising a detachable connection between the handle and the platform, a latching pawl pivoted on the base frame for locking said platform in raised position, a dog pivoted on said handle and operative to latch the handle in upright position, cooperating means on said pawl and dog for disengaging said pawl from said platform, and manually operative connections with said dog for actuating the same to unlatch the handle and to effect the disengagement of said pawl and platform to permit the latter to descend.

6. In an elevating truck, in combination, a base frame, steering and supporting wheels therefor, an elevating platform carried by said base frame, a steering handle pivoted for vertical swinging movement, means for elevating said platform by vertical swinging movement of said handle comprising a detachable connection between the handle and the platform, a latching pawl pivoted on the base frame for locking said platform in raised position, a dog pivoted on said handle for a limited amount of rocking movement, said dog being operative to latch the handle in upright position, cooperating means on said pawl and dog for disengaging said pawl from said platform, said dog and handle being arranged relatively to each other and to said pawl so that a maximum amount of rocking movement imparted to said dog when said handle is in upright position will disengage said latch from said platform and when said handle is otherwise positioned will set said dog to effect the disengagement of said latch and platform upon movement of said handle into upright position while a lesser amount of rocking movement imparted to said dog when said handle is upright will unlatch said handle without actuating said pawl, and means for actuating said dog.

In testimony whereof I have affixed my signature.

JAMES M. EATON.